United States Patent [19]

Kerimov et al.

[11] 3,992,566

[45] Nov. 16, 1976

[54] AERODYNAMIC AERIAL CONDUCTOR VIBRATION DAMPER

[76] Inventors: Jusif Museibovich Kerimov, 5 mikroraion, 15, kv. 3, Sumgait Azerbaidzhanskoi SSR; Leib Aronovich Zaltsberg, ulitsa Armyanskaya, 1, Baku Azerbaidzhanskoi SSR, both of U.S.S.R.

[22] Filed: Jan. 21, 1974

[21] Appl. No.: 435,317

[52] U.S. Cl. .................. 174/42; 174/135
[51] Int. Cl.² .......................... H02G 7/14
[58] Field of Search ............. 174/5 R, 28, 40 R, 42, 174/97, 99 R, 111, 135, 136; 114/235 F; 116/114 R, DIG. 33; 188/1 B; 166/176, 241; 308/4 A; 138/112, 113, 114

[56] References Cited
UNITED STATES PATENTS

| | | | |
|---|---|---|---|
| 2,408,253 | 9/1946 | Diebold | 174/136 |
| 2,793,917 | 5/1957 | Ward | 308/4 A |
| 3,048,649 | 8/1962 | McGavern | 174/42 |
| 3,225,259 | 12/1965 | Handing | 174/138 G X |
| 3,271,506 | 9/1966 | Martin et al. | 174/28 |
| 3,388,208 | 6/1968 | Liberman | 174/42 |
| 3,391,244 | 7/1968 | Moll | 174/40 R |

FOREIGN PATENTS OR APPLICATIONS

| | | | |
|---|---|---|---|
| 1,512,610 | 1/1968 | France | 174/97 |
| 424,293 | 2/1935 | United Kingdom | 174/5 R |
| 894,867 | 4/1962 | United Kingdom | 174/164 |

*Primary Examiner*—Laramie E. Askin
*Attorney, Agent, or Firm*—Haseltine, Lake & Waters

[57] ABSTRACT

The present invention relates to aerial power transmission lines, and more particularly to devices for suppressing the galloping of aerial conductors, specifically to an aerodynamic aerial conductor vibration damper.

The essence of the invention resides in that an aerodynamic aerial conductor vibration damper comprising an elongated plastic plate and a member clamping said plate to the conductor is such that said clamping member is also made of plastic and forms an integral part of said elongated plastic plate. Said member clamping the elongated plastic plate to the conductor is made in the form of a split sleeve the internal diameter whereof is less than the external diameter of the conductor so as to be interference-fitted thereon covering more than 180° of its circumference, and said clamping member is so disposed with respect to said elongated plastic plate that its generatrix is directed along the latter.

5 Claims, 8 Drawing Figures

AERODYNAMIC AERIAL CONDUCTOR VIBRATION DAMPER

The present invention relates to aerial power transmission lines, and more particularly to devices for suppressing the galloping of aerial conductors, specifically to an aerodynamic aerial conductor vibration damper.

It is common knowledge that by galloping of conductors is meant low-frequency large-amplitude natural vibration thereof with one or two half-waves per span, which is particularly detrimental to aerial power transmission lines. The galloping of conductors occurs under specific atmospheric conditions when conductors are glazed with ice on one side and exposed to winds having a speed of 5 to 18 m/sec.

This phenomenon is a serious hazard to power transmission lines and more often than not causes material damage thereto, sometimes even their destruction. This problem has prompted extensive research in an attempt to find practicable and reliable means for mitigating the galloping of conductors both on newly built power transmission lines and those long in operation.

This research is conducted in the following directions:
1. searching for various ways of preventing the accretion of ice on aerial conductors and abating eventual harmful consequences of their galloping;
2. development of new and improvement of the already known means for suppressing this phenomenon.

The first group of measures taken against galloping includes:

Various known methods of melting the ice accrued on aerial conductors by both alternating and direct current with power transmission lines being de-energized or by superposing the alternating current component on direct current; these methods are known to produce positive results but involve high power consumption and capital costs, which can only be justified in the case of large power systems located in areas noted for severe icing and, therefore, they have failed to find extensive application;

preventive heating of conductors with currents to inhibit the formation of ice thereon; this method yields excellent results provided it is applied to well-developed power systems where it is possible to switch over the load from one line to another and to maintain said load at such a level that the value of current through the conductors would ensure their heating to only +2° to 5° C, without overheating them, especially at junctions;

using special conductors made of a material with a Curie point from 0° to 10° C and a conductance of no less than $0.005 \cdot 10^6$ Siemens/cm$^3$, characterized by liberation of heat at the expense of field reversal losses, as well as various couplings, strips and sleeves mounted on conductors and made of alloys characterized by high resistivity and a sharp increase in their permeability at subzero temperatures, which results in a rise in temperature to a level corresponding to the Curie point; such devices are expensive and can be recommended for use only where a power transmission line traverses difficult terrain;

various methods of mechanically removing ice from conductors or using special greases and coatings; for their low efficiency, these methods have been abandoned;

methods of preventing crossing of conductors during galloping by increasing the spacing therebetween, which makes towers heavier and requires that double circuit lines be operated, during icing periods, in a big delta pattern when only 3 out of 6 conductors remain live, and other similar measures which, for lowering the efficiency of power transmission lines, have not found extensive application.

The second group of measures includes:

disrupting the mechanism of oscillations of conductors in a span by subjecting them to the action of special devices comprising rigid or spring-loaded insulating phase-to-phase spacers; similar methods are known whereby the mechanism of oscillations of conductors is upset by means of various vibration dampers suspended therefrom, which dampers comprise spring-loaded systems or inertia members, or elastic sleeves around conductors, which aid in dissipating the energy of their oscillations; these devices are generally too complicated, add to wind loads from conductors to towers, are difficult in manufacture, expensive and, therefore, not extensively used;

a method of increasing the oscillation energy losses by friction, consisting in that use is made of specially designed twisted conductors with air gaps between individual strands, the galloping of such conductors being suppressed due to increased frictional forces and different natural oscillation frequencies of the outer hollow conductor and the core; this method is not very efficient because the mechanical energy losses by friction are low and the difference between the oscillation frequencies is insignificant; at the same time, the manufacture of such conductors involves additional expenses rendering the power transmission line as a whole too costly;

a device for suppressing the galloping of conductors mounted directly on conductors in each span of a transmission line, based on the principle of suppressing torsional oscillations of a conductor by a spring-loaded inertia member; this device is too complicated, mounting it on conductors is rather difficult and it is not efficient enough in suppressing torsional oscillations which occur when galloping becomes vigorous rather than at its outset; all these factors render the device impracticable.

The latter group also includes a number of devices upsetting the mechanism of galloping oscillations acting upon a conductor in proximity to the supports.

A method is known, for example, whereby weights are suspended from a conductor by hangers arranged at a particular distance on either side of the point of its attachment to a suspension insulator. It is anticipated that spreading the load produced by a weight among a number of points over the length of a section in adjacent spans will prevent conductor galloping from intensifying. It has been proposed to mechanically link the conductors of adjacent spans on either side of the points of their attachment to suspension insulators, with or without various dampers, to prevent longitudinal displacement of the conductors and insulators suspended therefrom, as well as to make an adjacent span act upon the initial stage of galloping by changing its characteristics by way of partially damping the oscillation energy.

A means is also known for suppressing the galloping of conductors in adjacent spans, the galloping oscillations differing in their intensity and causing insulators to swing along the power line, which is based on the use of a hollow damping member filled with sand and travelling along a bent guiding member. No matter how effective all such means are, they are too complicated and expensive to be practicable. Moreover, the fact that insulators are articulated to the crossbars of the power line supports is, in some way or other, conducive to the displacement of damping devices together with the conductors attached thereto along the line, whereby the damping effect is attenuated and the oscillation energy is transmitted from span to span thus sustaining the natural oscillations of the conductors.

Among other known devices of this kind, a means is worth noting comprising spring-loaded damping members attached to jumper cables between widely spaced points of a conductor in adjacent spans close to the intermediate supports, the damping members also being secured, through insulating members, to said intermediate supports, and the conductors can be displaced, to some extent, along the power line by the pivoted levers of a damping member.

In yet another means, the damping of the longitudinal displacement of a conductor in the vicinity of the suspension clamps, whereby the galloping of the conductor is suppressed, is effected by means of a hydraulic or pneumatic damper disposed intermediate of a suspension clamp and a fixed member attached to a support with the aid of two horizontal rigid insulating spacers. To facilitate the displacement of the conductor along the power line, the fixed member, whereto the damper is coupled, has been provided with a longitudinal slot. In both cases, all the vertical loads are taken up by the suspension insulators.

A disadvantage common to all said means resides in their complexity and a relatively high cost of their manufacture, as well as their limited horizontal displacement ability, which renders the structure of the power line supports heavier if it is borne in mind that a support has to be designed for a substantial conductor tensioning difference caused by irregular detachment of ice therefrom and for a full unidirectional conductor tension in the event of an emergency (when the conductor in the adjacent span breaks).

And, finally, known in the art is the use of aerodynamic vibration dampers for mitigating the galloping of aerial conductors.

An aerodynamic aerial conductor vibration damper is known, for example, which comprises an elongated plastic plate of a particular shape (T-shaped), having four slots and four aluminium clamps for securing said plate to a conductor.

This aerodynamic vibration damper is disadvantageous in that it is secured to a conductor by means of a metal (aluminium) member, has no self-clamping members and is characterized by substantial corona and radio-interference losses, as well as structural complexity which makes it difficult to mount such a vibration damper on a power line conductor. Besides, the inner surface of each clamp is, in the course of time, worn out by mechanical action on the damper, and play appears which may cause the plate to slide towards the centre of sag of the conductor thus intensifying the liftinduced airflow, i.e. creating adverse aerodynamic conditions for the damper, which further invigorates galloping.

It is an object of the present invention to provide a simple aerodynamic aerial conductor vibration damper, adapted to be easily and reliably mounted on a conductor, and unaffected by corona and radio-interference losses.

Accordingly, it is the primary object of the invention to provide a simple aerodynamic aerial conductor vibration damper made entirely of an insulating material without metal clamping members and designed so as to be self-clamping when mounted on a conductor, the reliability of clamping increasing with a decrease in the ambient temperature, especially when the atmospheric conditions are favourable for the formation of an ice coating on the conductor.

This object is attained by that in an aerodynamic aerial conductor vibration damper comprising an elongated plastic plate and a member clamping said elongated plastic plate to said conductor, said clamping member is, according to the invention, made of plastic in the form of a split sleeve integral with said elongated plastic plate, the internal diameter thereof being less than the external diameter of said conductor so that said clamping member can be interferencefitted on the latter covering more than 180° of its circumference, and said clamping member being so disposed with respect to said elongated plastic plate that its generatrix is directed along the latter.

It is advisable to arrange the aerodynamic vibration damper so that the elongated plastic plate lies in the plane passing through the longitudinal geometrical axis of said clamping member made in the form of a split sleeve, on one side thereof.

It is also advisable to arrange the aerodynamic vibration damper so that the elongated plastic plate lies in the plane passing through the longitudinal geometrical axis of said clamping member made in the form of a split sleeve, one portion of said elongated plastic plate being on one side of said clamping member and the other portion on the other side thereof.

The proposed aerodynamic aerial conductor vibration damper is simple in design and easy in manufacture. It can be easily mounted on an aerial conductor, being reliably self-clamping in the position it has been mounted. Experimental data indicate that the present vibration damper is highly effective in suppressing the galloping of aerial power line conductors.

Since the proposed aerodynamic vibration damper has no metal parts, it is not affected by corona and radiointerference losses.

Figure 1:
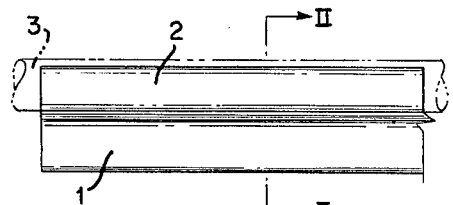
FIG. 1 is a side view of an aerodynamic aerial conductor vibration damper according to the present invention with the elongated plastic plate being disposed on one side of the clamping member.
Figure 2:
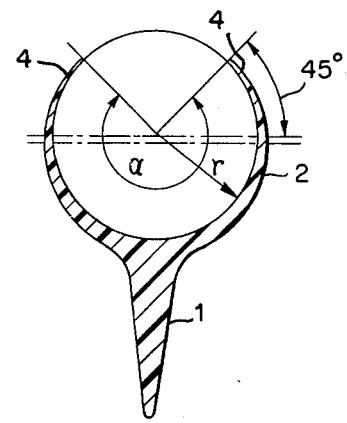
FIG. 2 is a sectional view taken along line II—II of FIG. 1.
Figure 3:
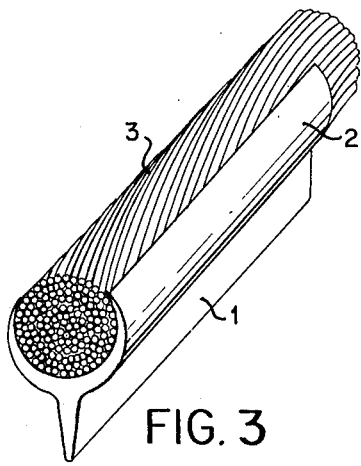
FIG. 3 is an isometric projection of the proposed aerodynamic vibration damper with its elongated plastic plate being disposed on one side of the clamping member, according to the invention.

The proposed aerodynamic aerial conductor vibration damper is an all-plastic structure of a particular shape, comprising an elongated plate 1 (FIGS. 1 to 3) and a clamping member 2 made integral with said elongated plate.

The clamping member is made in the form of a split sleeve having an internal diameter less than the diameter of a conductor 3 so that it can be interference-fitted thereon. Thus, the proposed vibration damper is rendered self-clamping when mounted on a bare conductor. As is seen from FIGS. 1 to 3, said split sleeve is arranged along the elongated plastic plate with which it is made integral. It is obvious that the generatrix of the inner surface of said split sleeve is also directed along said elongated plate.

The self-clamping ability of the proposed vibration damper is ensured by the provision of collars 4 the internal radius r whereof corresponds to the external radius of the aerial conductor on which the damper is mounted with allowance made for the shrinkage of the material being used, as well as for the required interference fit. The angle α may vary within a wide range, the optimum value thereof for widely used conductors 24 and 3 mm in diameter being equal to about 270°.

The collars are adapted to be spread apart for the thickness of the conductor to enable the damper to be fitted thereon, which is ensured by the elasticity of the selected plastic (polyethylene, etc.).

The proposed aerodynamic vibration damper is mounted on a conductor by spreading apart the collars 4, which is easily done by hand, and fitting it on the conductor.

Figure 4:
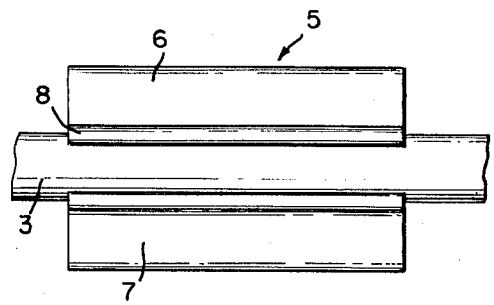
FIG. 4 shows the proposed aerodynamic vibration damper together with a length of the conductor on which it is mounted, with its elongated plastic plate being disposed so that a portion thereof is on one side of the clamping member and the other portion is on the other side of the latter, according to the invention.
Figure 5:
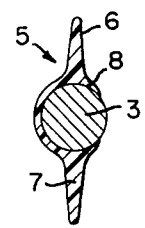
FIG. 5 is a cross-sectional view of the vibration damper of FIG. 4.

In another embodiment of the present invention, the aerodynamic vibration damper comprises an elongated plastic plate 5 (FIGS. 4 and 5) consisting of two portions 6 and 7 disposed on either side of a clamping member 8 made in the form of a split sleeve, which clamping member secures said vibration damper to a conductor 3.

Figure 6:
FIG. 6 shows the shape of the cross-section of the proposed aerodynamic vibration damper with its elongated plastic plate being arranged as in FIG. 4 so that both portions thereof disposed on either side of the clamping member are equal in height.
Figure 7:
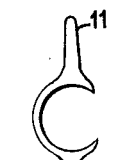
FIG. 7 shows the shape of the cross section of the proposed aerodynamic vibration damper with its elongated plastic plate being arranged as in FIG. 4 so that both portions thereof disposed on either side of the clamping member are different in height.
Figure 8:
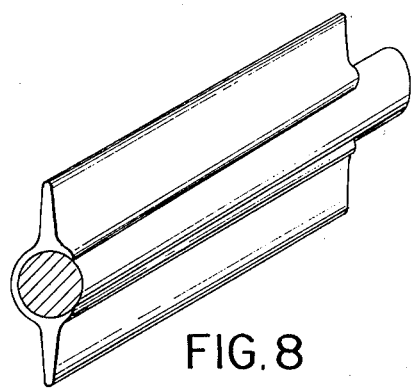
FIG. 8 is an isometric projection of the aerodynamic vibration damper shown in FIGS. 4 to 7.

In this case, said two portions of the elongated plastic plate may be equal in height (portions 9 and 10, FIG. 6) or different in height (portions 11 and 12, FIG. 7).

Such a design of the aerodynamic aerial conductor vibration damper, i.e. when the elongated plastic plate consists of two portions disposed on either side of the clamping member, offers additional advantages, namely:

it creates favourable conditions for a more intensive vortex formation, which effectively suppresses the lift inducing the galloping of conductors;

it prevents the accretion of ice on conductors, which ice accretion fosters intensive galloping;

it precludes, fully or partially, the occurrence of a torque in the aerodynamic damper-conductor system, which torque occurs when the plate is arranged on one side of the conductor whereby the lift inducing the galloping thereof is effectively suppressed;

it minimizes labour-consumption in mounting such aerodynamic dampers.

In 1972, a number of the proposed aerodynamic aerial conductor vibration dampers were mounted on one of the two parallel lines, spaced apart at 70 m, of the 220 KV ali-Bairamly - Khurdalany network which had long been in operation. The dampers were mounted along a 20 km stretch of the line most affected by galloping.

In January 1973, vigorous, galloping of conductors accurred which caused repeated tripping-off of the line which was not provided with aerodynamic dampers and, to prevent complete destruction of the line, it had to be de-energized. On the other line, equipped with aerodynamic dampers, the galloping of conductors was effectively mitigated (the amplitude of galloping was 4 times less than that on the line without dampers) and it was possible to keep it in operation as the line provided with dampers operated normally.

What is claimed is:

1. An aerodynamic vibration damper in combination with an aerial conductor, comprising an elongated plastic plate, plastic clamping means clamping said elongated plastic plate to said aerial conductor; said plastic clamping means being integral with said elongated plastic plate and comprising a split sleeve with an internal cavity following the cross-section of said aerial conductor; said internal cavity having lateral dimensions smaller than the corresponding external lateral dimensions of said aerial conductor, said split sleeve embracing a part of the surface of said aerial conductor, the dimensions of said part providing for an interference fit of said split sleeve on said aerial conductor; the ends of said split sleeve being thinner than the other part thereof, the thickness of said split sleeve increasing continually in the direction from the parted ends of said sleeve to said elongated plastic plate; said split sleeve being disposed relative to said elongated plastic plate so that its generatrix is directed along the latter.

2. A combination as claimed in claim 1, wherein said elongated plastic plate is disposed on one side of said clamping means, and being arranged in the plane passing close to the geometrical longitudinal axis of said split sleeve.

3. A combination as claimed in claim 1, wherein said elongated plastic plate lies in a plane passing close to the geometrical longitudinal axis of said split sleeve and is disposed so that one portion of said elongated plastic sleeve is on one side of said split sleeve and the other portion thereof is on the other side of said split sleeve.

4. A combination as claimed in claim 1, wherein said internal cavity is of a round cross section.

5. A combination as claimed in claim 1, wherein said internal cavity has a smooth surface.

* * * * *